(12) United States Patent
Suzuki et al.

(10) Patent No.: US 6,499,457 B2
(45) Date of Patent: Dec. 31, 2002

(54) IN-CYLINDER INJECTION GASOLINE ENGINE

(75) Inventors: Yuichi Suzuki, Iwata (JP); Uichitake Uchiyama, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/683,137

(22) Filed: Nov. 26, 2001

(65) Prior Publication Data

US 2002/0073956 A1 Jun. 20, 2002

(30) Foreign Application Priority Data

Dec. 19, 2000 (JP) .......................................... 2000-385946

(51) Int. Cl.[7] .............................................. F02B 17/00
(52) U.S. Cl. ...................... 123/295; 123/305; 123/298; 123/302
(58) Field of Search .................................. 123/295, 298, 123/302, 305

(56) References Cited

U.S. PATENT DOCUMENTS

| 5,329,901 A | * | 7/1994 | Onishi | 123/298 |
| 6,035,824 A | * | 3/2000 | Lee | 123/295 |
| 6,267,107 B1 | * | 7/2001 | Ward | 123/661 |

* cited by examiner

Primary Examiner—Erick Solis
(74) Attorney, Agent, or Firm—Ernest A. Beutler

(57) ABSTRACT

A number of combustion chamber configurations for direct injected engines wherein the fuel injectors inject at least two fuel patches in circumferentially spaced locations. This fuel is injected into a cavity arrangement formed in the head of the piston, which directs the fuel upwardly toward a pair of circumferentially spaced spark plugs so as to insure complete combustion within the combustion chamber. Embodiments having single and paired cavities in the piston head are disclosed.

23 Claims, 6 Drawing Sheets

IN-CYLINDER INJECTION GASOLINE ENGINE

BACKGROUND OF INVENTION

This invention relates to an in-cylinder injection gasoline engine and more particularly to a combustion chamber arrangement for such engines.

It has been proposed to employ direct cylinder injection to improve the performance and particularly the fuel economy and exhaust emission control of internal combustion engines. By utilizing direct cylinder injection, it is possible to obtain stratification under some running conditions to allow the engine to run on a leaner than stoichiometric mixture. In this way it is not necessary to provide a homogeneous stoichiometric mixture in the entire combustion chamber to initiate combustion and to develop the required power.

To accomplish this in an open chamber, the fuel injector must inject fuel in a way to form a fuel patch that will be present at the spark gap at the time it is fired. Although this can be easily accomplished if a pre-chamber is employed, it is difficult to achieve this result in an "open chamber". Open chambers are preferred for a variety of reasons including the pumping losses generated by the pre-chamber.

FIGS. 1 and 2 illustrate a typical type of approach that attempts to produce this result in an open chamber. FIG. 1 is a top plan view of a piston used in the arrangement and the associated fuel injector as mounted in the cylinder head. FIG. 2 is a cross sectional view taken along the line 2—2 of FIG. 1. As seen in these figures, a piston, indicated generally by the reference numeral 11 reciprocates in a cylinder bore, indicated by the reference numeral 12. The piston 11, cylinder bore 12 and an associated cylinder head surface 13 define the combustion chamber.

The head of the piston 11 is formed with a dome comprised of a pair of angularly related, inclined surfaces 14 and 15 which join a generally flat upper surface 16. A bowl or recess 17 is formed in the piston head and extends through the inclined surface 15 and the upper flat surface 16. This bowl 17 has a generally curved configuration which extends upwardly and terminates at its inner peripheral edge adjacent a spark plug 18. The spark plug 18 positioned generally on the axis of the cylinder bore 12.

A fuel injector 19 is mounted in the cylinder head surface 13 or cylinder block at one side of the cylinder bore 12. This fuel injector 19 sprays fuel toward and into the piston bowl 17. In addition, a swirl is generated in the combustion chamber as indicated by the arrows A. This swirl is generated by the induction system so as to sweep the injected fuel in a path indicated by the arrow B in the bowl 17 and toward the gap of the spark plug 18. In addition, the inclined surface 14 forms a squish area that drives the air in the direction indicated by the arrows D in FIG. 2. so as to prevent the fuel from escaping from the bowl 17 beyond the outer periphery of the area bounded by the spark plug 18.

An engine of this type may also be provided with a variable valve timing mechanism for varying the valve timing and/or degree of opening of the valves. Thus, the configuration of the combustion chamber and particularly the head surface of the piston 11 must be such as to afford clearance between the valve heads and the piston surfaces under all timing and lift conditions. This results in the formation of a lower than desired compression ratio.

Also, under off idle loads there may be fuel left deposited on the piston bowl 17 after combustion has completed. This increases the problem of hydrocarbon emissions. Furthermore, even though the spark plug 18 is positioned at the center of the combustion chamber, there is a likelihood that fuel may pass beyond the bowl 17 toward the opposite side of the combustion chamber regardless of the swish action indicated by the arrows D. Thus there can be further unburned fuel in the combustion chamber.

Furthermore these conditions increase the likelihood of knocking, even though a low compression ratio has been dictated by the bowl configuration.

It is, therefore, a principle object to this invention to provide an improved combustion chamber for a direct injected internal combustion engine wherein the compression ratio may be significantly raised without causing problems in clearance for the valves and while insuring rapid flame propagation and complete combustion under all running conditions.

It is a further object to this invention to provide an improved high efficiency combustion chamber, fuel injection and ignition arrangement for direct injected engines.

SUMMARY OF INVENTION

This invention is adapted to be embodied in an internal combustion engine that is comprised of an engine body that defines at least one cylinder bore that is closed at one end by a cylinder head surface and at the other end by the head of a piston that reciprocates in the cylinder bore. A fuel injector is mounted in the engine body contiguous to the axis of the cylinder bore. The fuel injector is configured to spray fuel downwardly toward the piston head and in at least two circumferentially spaced, fuel injection directions. The piston head is formed with a cavity arrangement having at least two circumferentially spaced, concave curved wall portions that curve upwardly toward the cylinder head at their radially outer extent. The circumferential spacing at the fuel injection directions correspond to the circumferential spacing of the piston concave curved wall portions so that fuel sprayed from the fuel injector is directed toward the piston concave curved wall portions. A pair of circumferentially spaced ignition devices are provided in the cylinder head surface in proximity to the upper ends of the piston concave curved wall portions for igniting the fuel sprayed from the fuel injector.

DETAILED DESCRIPTION

Figure 1:
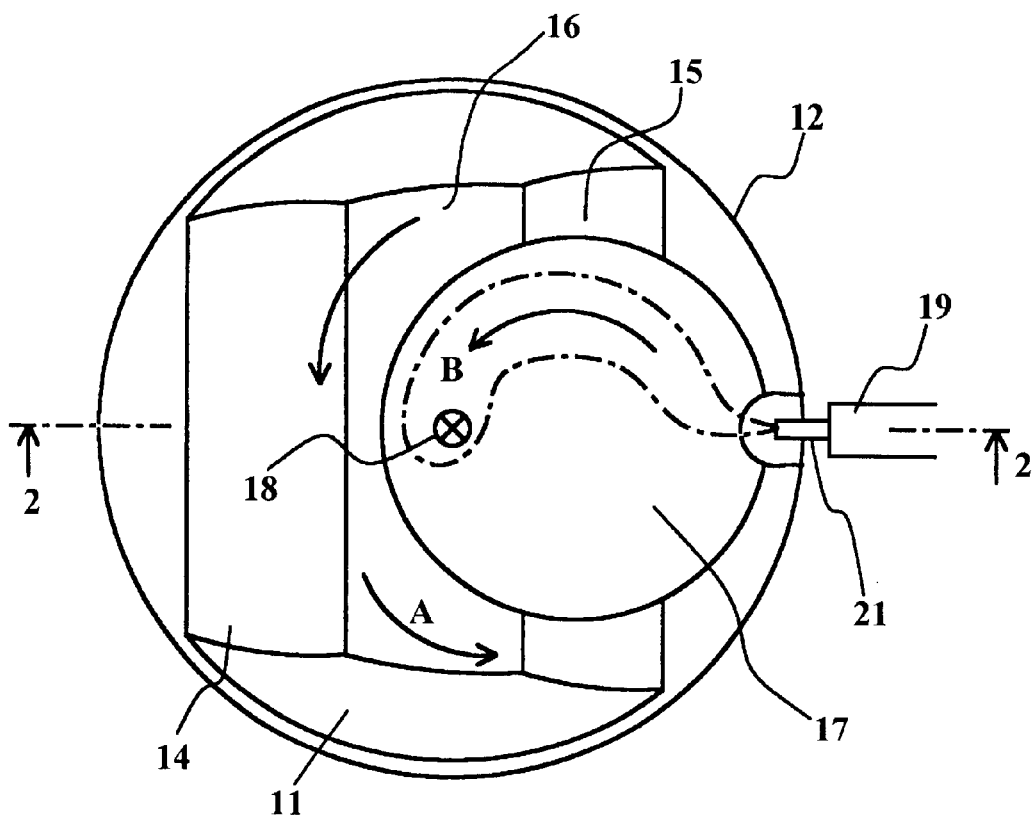
FIG. 1 is a top plan view of a piston constructed in accordance with a prior art type of construction and which shows the fuel injection nozzle associated therewith and the directions of fuel and air flow in the combustion chamber.
Figure 2:
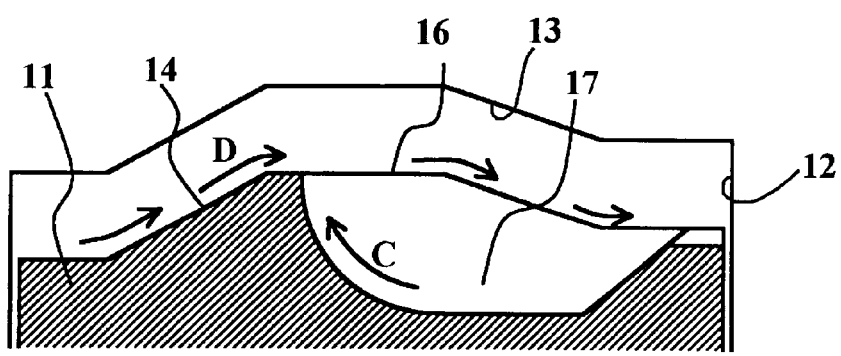
FIG. 2 is a cross sectional view taken along the line 2—2 of FIG. 1 and again shows the prior art construction.
Figure 3:
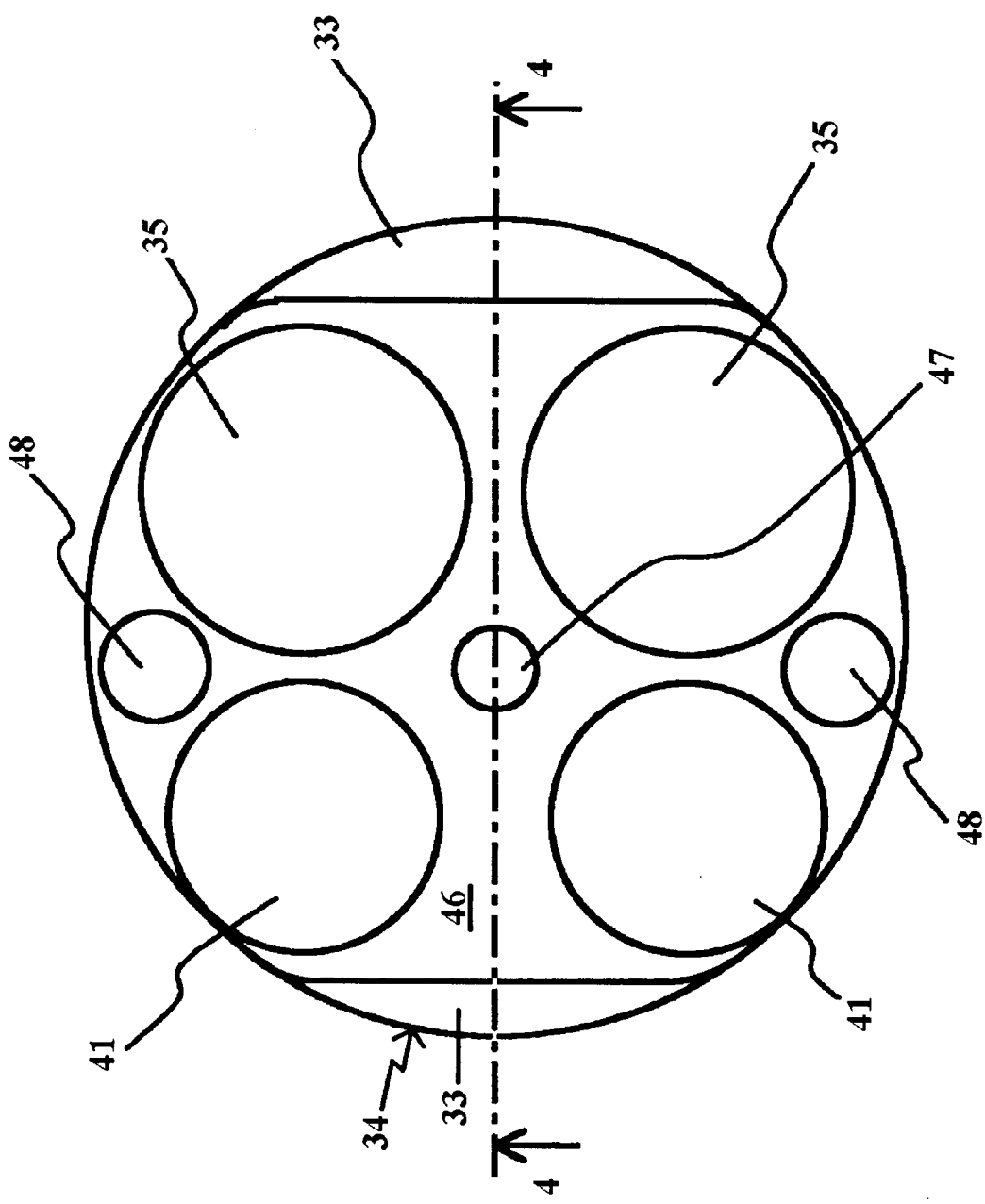
FIG. 3 is a bottom plan view of a cylinder head of a first embodiment of the invention.
Figure 4:
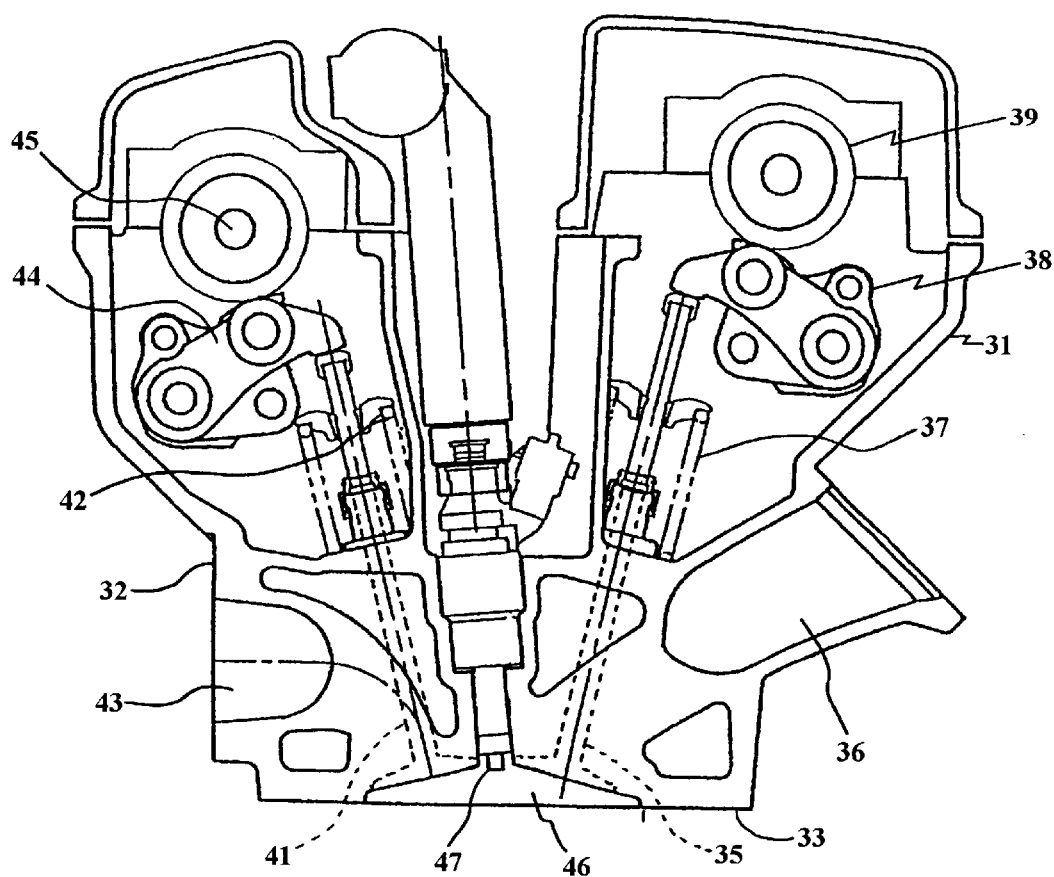
FIG. 4 is a cross sectional view taken along the line 4—4 of FIG. 3.

Referring first to the first embodiment and initially to FIGS. 3 and 4, they illustrate in detail a cylinder head assembly identified generally by the reference numeral 31. This cylinder head assembly 31 includes a main cylinder head member 32 that has a lower surface 33 that is adapted to be affixed to an associated cylinder block (not shown) in sealing relationship around a cylinder bore formed therein.

Although the construction is described in conjunction with a single cylinder, it should be readily apparent that the invention can be utilized with engines having a wide variety of cylinder numbers and cylinder configuration. Also, since the invention deals primarily with the cylinder head configuration and the associated combustion chamber resulting there from, the illustration of the cylinder block is not believed to be necessary to permit those skilled in the art to practice the invention. However, the cylinder bore has a diameter which supports an outer peripheral surface of a piston, indicated by the reference numeral 34. The shape of the head portion will be described later in more reference to FIG. 5.

FIG. 3, a bottom plan view of the cylinder head member 32 looking generally upwardly in the direction of FIG. 4, shows the placement of the various valves and other components associated with the engine. These include a pair of intake valves 35 which are disposed generally on one side of a plane containing the cylinder bore axis and which valve the flow through the intake passages 36 formed in the cylinder head member 32. These intake passages 36 are depicted as being of the Siamese type and are associated with a suitable induction system. Again, since the invention deals primarily with the configuration and layout of the combustion chamber, the detailed description of the induction system and the mechanism for operating the intake valves 35 is not believed to be necessary to permit those skilled in the art to practice the invention. However, for the sake of completeness, this valve operating mechanism includes valve springs 36 that urge the intake valves 35 to their closed position. Rocker arm assemblies 37, which may include variable lift mechanisms of any known type, are interposed between the lobes of an intake camshaft 38 and the stems of the intake valves 35 for opening these valves against the action of the springs 36. The intake camshaft 39 is driven at one half crankshaft speed by a suitable drive mechanism and this may include a WT mechanism for varying the phase angle of the opening of the intake valves 35 during engine operation.

A pair of exhaust valves 41 are positioned in the cylinder head member 32 on the opposite side of the aforenoted plane from the intake valves 35. These exhaust valves 41 have stem portions and are urged to their closed position by coil compression springs 42. A suitable operating mechanism for the exhaust valves can be provided for controlling the flow through Siamese exhaust passages 43 formed in the cylinder head member 32 on the side opposite the intake passages 37.

This valve operating mechanism may, for example, be comprised of variable lift rocker arm assemblies 44 that are operated by the cam lobes of an exhaust camshaft 45. The exhaust camshaft 45, like the intake camshaft 39, is driven at one half crankshaft speed by any suitable timing drive. This may also include a VVT mechanism so as to vary the phase angle of opening and closing of the exhaust valves 41.

While continuing to refer primarily to FIGS. 3 and 4, the cylinder head surface which cooperates for the most part with the head of the piston 34 is comprised of a recessed surface area 46 which forms with the head of the piston 34 and the combustion chambers of the engine. Parts of the cylinder head surface 33 overly portions of the cylinder bore as seen in FIG. 3 where the outer periphery of the piston 34 is illustrated.

Positioned generally on the axis of the cylinder bore is provided a fuel injector 47 which is disposed to have a bifurcated fuel injection nozzle having a pair of openings that spray in generally diametrically opposite directions. These directions are generally parallel to or within the aforenoted plane that divides the intake and exhaust sides of the cylinder head member 32.

Figure 5:
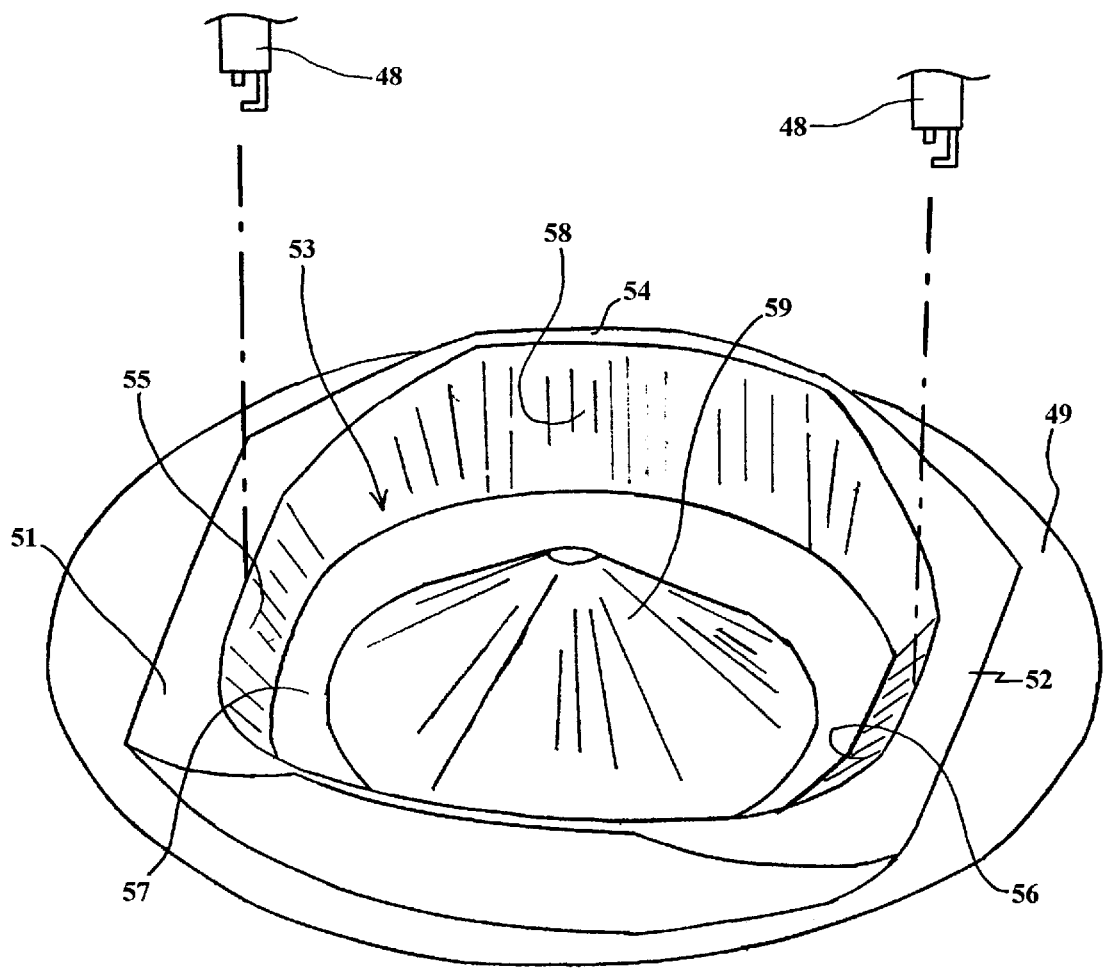
FIG. 5 is a perspective view showing the piston head of this embodiment and the relationship of the spark plugs to this piston head configuration.

Positioned at the outer peripheral edges of the same plane are a pair of spark plugs 48 that have their spark gaps disposed in a relationship which is shown best in FIG. 5 and which are fired by a suitable ignition system.

Referring now to FIG. 5, it will be seen that the piston head is configured with a generally flat peripheral squish area 49 that surround a dome. This dome is formed in part by pair of upwardly inclined parts 51 and 52 that extend above the squish area 49. A bowl or cavity, indicated generally by the reference numeral 53 is formed in this dome. The dome area in this embodiment may have a generally flat upper surface 54, which is intersected by the inclined surfaces 51 and 52.

A pair of concave curved portions 55 and 56 are formed at opposite sides of the bowl 53. These concave curved portions extend in substantial part through the inclined portions 51 and 52 and extend upwardly from a generally planar annular area 57 at the bottom of the bowl 53. These concave curved portions 55 and 56 are joined with each other at their peripheral edges by curved surfaces 58. A raised, generally conical shape projection 59 is encircled by the flat piston head area 57 and extends upwardly toward the cylinder head recess 56. The upper end of the projection 59 is juxtaposed to the fuel injector 47.

Thus, depending upon the injection timing, which will be described in more detail shortly, the fuel from the two nozzle parts of the fuel injector 46 will be sprayed downwardly toward the inclined parts of the dome portion 59 facing the curved outer wall portions 55 and 56. The fuel will then be directed downwardly by these inclined parts toward the flat area 57 and then turned upwardly by the curved wall portions 55 and 56 toward the gaps of the spark plug 49. Thus, the fuel will be spread across the diameter of the cylinder head and piston head, but confined within the area encompassed by the spark plugs 48.

Thus, when the spark plugs 48 are fired, they will be surrounded by a stoichiometric mixture of fuel that is stratified under low speed and mid-range performance running. This mixture will be easily ignited under all of the conditions and total flame propagation will be insured across the complete combustion chamber including the area outside of the piston head recess 53. Thus all fuel in the combustion chamber will be ignited and can be completed burned. Also, it should be noted that the recess 53 is disposed so that it will extend below the peripheral edges of the intake valves 35 and exhaust valves 41 so that further clearance recesses are not required to be formed in the piston head. In addition, this will insure good valve clearance even though the lift and timing are significantly changed depending upon engine running conditions. Thus, knocking can not only be reduced but substantially eliminated. Furthermore this efficient combustion will decrease NOx emissions and the amount of unburned hydrocarbons present in the exhaust gases.

Dealing now specifically with the injection timing, under partial loads, fuel is injected late in the timing schedule. For example, fuel is injected on the latter half of a compression stroke for example beginning on the range of 70° to 50° before top dead center (BTDC). However, as the engine speed and load increases, the fuel injection timing is advanced and in fact can be advanced to the intake stroke, for example, from at top dead center (TDC) to 50° after TDC. Because the fuel is injected toward the head of the piston 34, however, the piston head will be cooled and knocking will be precluded under high speed, high load conditions.

Figure 6:
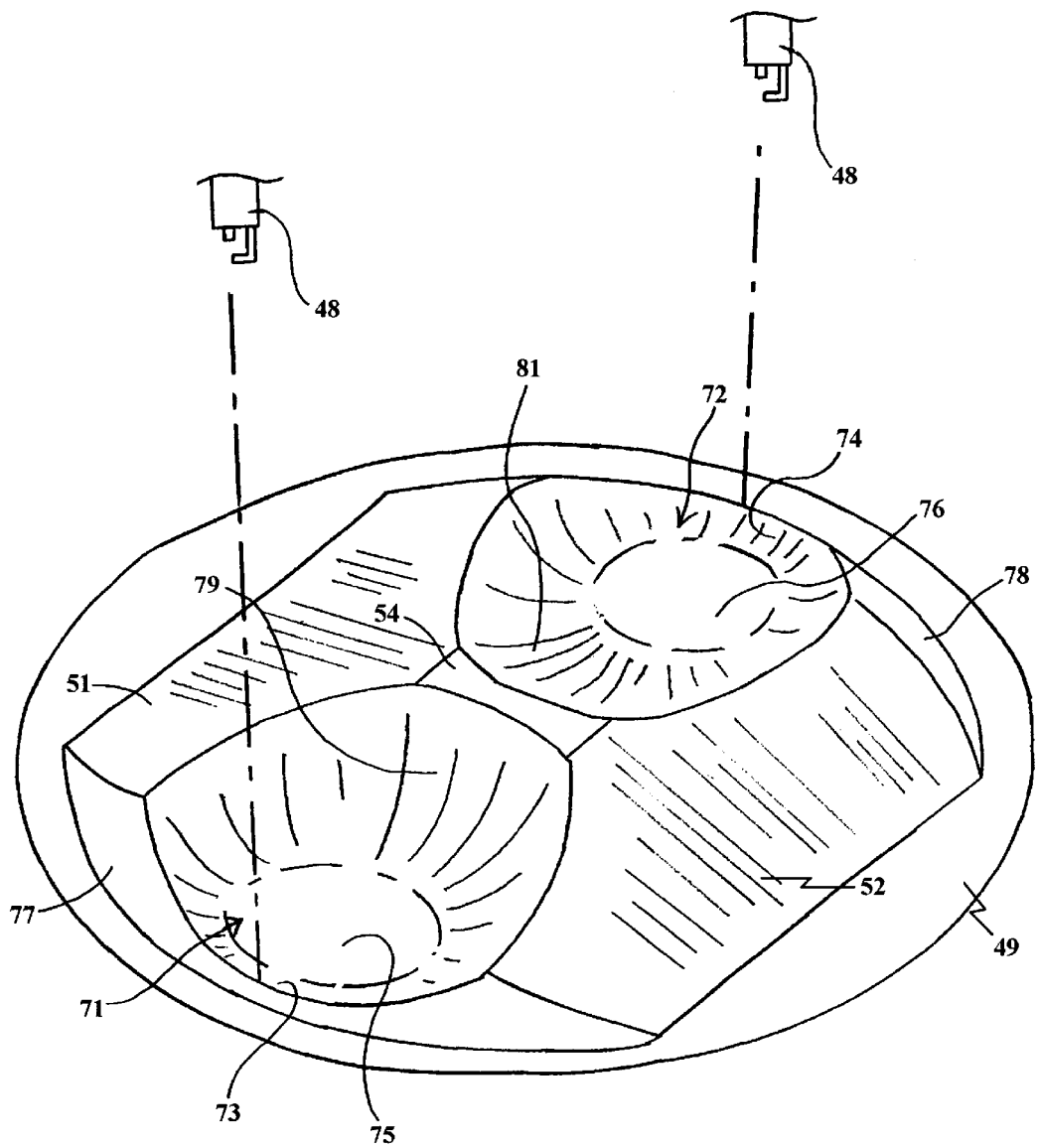
FIG. 6 is a view, in part similar to FIG. 5, and shows another embodiment of piston head configuration.

FIG. 6 shows another embodiment of the invention in which the cylinder head and valve arrangement is as shown in FIGS. 3 and 4. However, the head of the piston 34 has a slightly different configuration. This is comprised of a raised dome again formed by inclined side portions 51 and 52 that are joined at their central part by a generally flat area 54. In this embodiment, however, there is provided a pair of side by side cavities 71 and 72, each of which have concave, curved outer portions 73 and 74 respectively that curve upwardly from their respective lower planar surfaces 75 and 76 toward the spark plugs 48.

The circumferential spacing of these curved concave portions 73 and 74 is the same as the circumferential spacing of the spark plugs 48 and the spray paths from the associated fuel injector. In this embodiment, however, these curved side portions 73 pass through the side walls 77 and 78 which join the sides of the inclined portions 51 and 52 and hence, permit more open flow to the outer periphery of the cylinder bore in this area.

Opposing these concave, curved side portions 73 and 74 are inclined walls 79 and 81, which receive the fuel that is sprayed by the two ports of the fuel injector (fuel injection nozzle 47 which is not shown in this figure). The flat portion 54 of the piston head tends to separate these charges from each other, but once firing begins the flame will propagate across this area so as to achieve the same results as with the previously described embodiment. The advantages of this embodiment are the same as those previously described and the actual cavity area in the piston head can be less while still providing the clearance for the intake and exhaust valves and accommodating the variable lift and variable valve timing of them.

Figure 7:
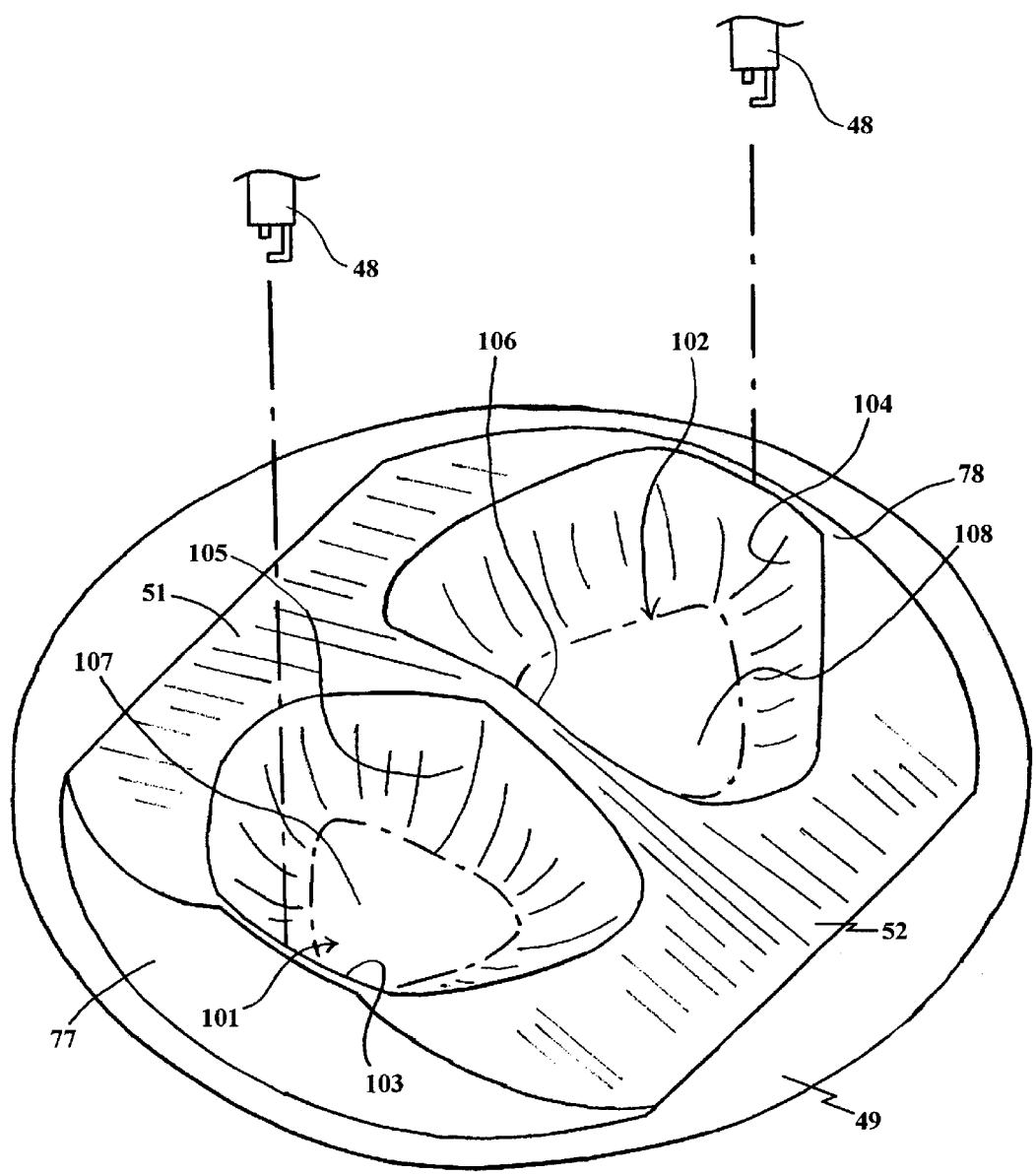
FIG. 7 is a perspective view, in part similar to FIGS. 5 and 6, and shows a still further embodiment of the piston head construction.

FIG. 7 shows another embodiment of the invention, which, like the embodiment of FIG. 6, employs two cavities formed in the piston head, these cavities being indicated by the reference numerals 101 and 102, respectively. The shape of the piston head outside of these cavities is the same as that previously described and, therefore, these same components are identified by the same reference numerals. In this embodiment, the concave, curved outer surfaces 103 and 104 of the recesses 101 and 102 do no extend through the side walls 77 and 78, but nevertheless still terminate at the gaps of the spark plugs 48. Opposing inclined walls 105 and 106 of the cavities 101 and 102 extend upwardly from flat areas 107 and 108. These walls 105 and 106 are somewhat triangular shape so as to more closely focus the flow of fuel toward the narrow opposing concave, curved surfaces 103 and 104 so as to further confine the fuel flow toward the spark plugs 48 particularly under conditions when small amounts of fuel are injected. This combustion chamber configuration can also have an injection timing arrangement as set forth in the previous embodiment.

Thus, from the foregoing description it should be readily apparent that the described combustion chamber configurations function so as to permit separate fuel patches to be formed on opposite sides of the piston so as to minimize the amount of space taken by these cavities and to more uniformly distribute the fuel over the combustion chamber. Nevertheless, sufficient recesses are provided for the valves so as to permit the use of variable valve lift and variable valve timing mechanism without adversely affecting the compression ratio. Of course, the foregoing description is that of preferred embodiments of the invention and various changes and modifications may be made without departing from the spirit and scope of the invention, as defined by the appended claims.

What is claimed is:

1. An internal combustion engine comprised of an engine body defining at least one cylinder bore in closed at one end by a cylinder head surface and at the other end by the head of a piston reciprocating in said cylinder bore, a fuel injector mounted in said engine body contiguous to the axis of said cylinder bore and configured to spray fuel downwardly toward said piston head in at least two circumferentially spaced fuel injection directions, said piston head being formed with a cavity arrangement having at least two circumferentially spaced, concave curved wall portions that curve upwardly toward said cylinder head surface at their radially outer extent, the circumferential spacing of said fuel injection directions corresponding to the circumferential spacing of said piston concave, curved wall portions so that the fuel spray from said fuel injector is directed toward said piston concave, curved wall portions, and a pair of circumferentially spaced ignition devices in said cylinder head surface in proximity to the upper ends of said piston concave, curved wall portions for igniting the fuel sprayed from said fuel injector.

2. The internal combustion engine as set forth in claim 1, wherein each of the piston concave, curved wall portions is connected at its radially inner edge to an upwardly inclined portion that extends toward the cylinder head surface in proximity to the fuel injector.

3. The internal combustion engine as set forth in claim 2, wherein the upwardly inclined portions associated with each of the piston concave, curved wall portions are separated from each other at the head of the piston.

4. The internal combustion engine as set forth in claim 1, wherein the head of the piston is defined by a pair of inclined parts that converge upwardly toward the cylinder bore axis.

5. The internal combustion engine as set forth in claim 4, wherein the inclined parts of the piston are separated at their uppermost terminations by the piston head.

6. The internal combustion engine as set forth in claim 5, wherein each of the piston concave, curved wall portions is formed in a respective one of the piston head inclined parts.

7. The internal combustion engine as set forth in claim 6, wherein each of the piston concave, curved wall portions is connected at its radially inner edge to an upwardly inclined portion that extends toward the cylinder head surface in proximity to the fuel injector and each of which is formed in a respective one of the piston head inclined parts.

8. The internal combustion engine as set forth in claim 1, wherein each of the piston concave, curved wall portions is formed by a common cavity in the piston head.

9. The internal combustion engine as set forth in claim 8, wherein each of the piston concave, curved wall portions is connected at its radially inner edge to an upwardly inclined portion that extends toward the cylinder head surface in proximity to the fuel injector.

10. The internal combustion engine as set forth in claim 9, wherein the upwardly inclined portions associated with each of the piston concave, curved wall portions are separated from each other at the head of the piston.

11. The internal combustion engine as set forth in claim 8, wherein the head of the piston is defined by a pair of inclined parts that converge upwardly toward the cylinder bore axis.

12. The internal combustion engine as set forth in claim 11, wherein the inclined parts of the piston are separated at their uppermost terminations by the piston head.

13. The internal combustion engine as set forth in claim 12, wherein each of the piston concave, curved wall portions is formed in a respective one of the piston head inclined parts.

14. The internal combustion engine as set forth in claim 13, wherein each of the piston concave, curved wall portions is connected at its radially inner edge to an upwardly inclined portion that extends toward the cylinder head surface in proximity to the fuel injector and each of which is formed in a respective one of the piston head inclined parts.

15. The internal combustion engine as set forth in claim 1, wherein each of the piston concave, curved wall portions is formed by a respective cavity in the piston head.

16. The internal combustion engine as set forth in claim 15, wherein each of the piston concave, curved wall portions is connected at its radially inner edge to an upwardly inclined portion that extends toward the cylinder head surface in proximity to the fuel injector.

17. The internal combustion engine as set forth in claim 16, wherein the upwardly inclined portions associated with each of the piston concave, curved wall portions are separated from each other at the head of the piston.

18. The internal combustion engine as set forth in claim 15, wherein the head of the piston is defined by a pair of inclined parts that converge upwardly toward the cylinder bore axis.

19. The internal combustion engine as set forth in claim 18, wherein the inclined parts of the piston are separated at their uppermost terminations by the piston head.

20. The internal combustion engine as set forth in claim 19, wherein each of the piston concave, curved wall portions is formed in a respective one of the piston head inclined parts.

21. The internal combustion engine as set forth in claim 20, wherein each of the piston concave, curved wall portions is connected at its radially inner edge to an upwardly inclined portion that extends toward the cylinder head surface in proximity to the fuel injector and each of which is formed in a respective one of the piston head inclined parts.

22. The internal combustion engine as set forth in claim 1, wherein a pair of intake ports and a pair of exhaust ports formed in the cylinder head serve the cylinder bore and each ignition device is disposed between one of said intake ports and one of said exhaust ports.

23. The internal combustion engine as set forth in claim 1, wherein the intake and exhaust ports are disposed at opposite sides of respective ones of the piston concave, curved wall portions.

* * * * *